US005924594A

United States Patent [19]

Kelly

[11] Patent Number: 5,924,594

[45] Date of Patent: Jul. 20, 1999

[54] COLLECTION CONTAINER ASSEMBLY

[75] Inventor: Karin E. Kelly, Los Angeles, Calif.

[73] Assignee: Becton Dickinson and Company, Franklin Lakes, N.J.

[21] Appl. No.: 08/928,350

[22] Filed: Sep. 12, 1997

[51] Int. Cl.[6] .................... G01N 35/00

[52] U.S. Cl. .................... 220/737; 422/102

[58] Field of Search .................... 220/62.15, 592.23, 220/592.27, 737; 422/102, 104

[56] References Cited

U.S. PATENT DOCUMENTS

| | | | |
|---|---|---|---|
| 3,796,552 | 3/1974 | Robinson et al. | 422/102 X |
| 4,106,907 | 8/1978 | Charlton et al. | 422/102 X |
| 4,483,616 | 11/1984 | Liston et al. | 356/246 |
| 4,578,588 | 3/1986 | Galkin | 250/432 |
| 4,980,129 | 12/1990 | Columbus | 422/61 |
| 5,096,062 | 3/1992 | Burkardt et al. | 206/361 |
| 5,132,232 | 7/1992 | Parker | 422/102 X |
| 5,167,929 | 12/1992 | Korf et al. | 422/102 |
| 5,236,604 | 8/1993 | Fiehler | 210/782 |
| 5,382,409 | 1/1995 | Baxter | 422/102 |
| 5,454,958 | 10/1995 | Fiehler | 210/782 |
| 5,456,887 | 10/1995 | Calvo et al. | 422/104 |
| 5,536,476 | 7/1996 | Baxter | 422/102 |
| 5,780,248 | 7/1998 | Milchanoski | 422/102 X |

*Primary Examiner*—Steven Pollard
*Attorney, Agent, or Firm*—Nanette S. Thomas, Esq.; Keith McWha, Esq.

[57] ABSTRACT

The present invention is a specimen collection container assembly comprising an inner tube within an outer tube wherein the external dimensions of the inner tube are less than the external dimensions of the outer tube and the internal volume of the inner tube is less than the internal volume of the outer tube. The assembly of the present invention provides a means for adapting a full-draw or standard-sized blood collection tube to handle a reduced internal volume for handling by equipment configured to handle standard-sized blood collection tubes having standard external dimensions.

11 Claims, 4 Drawing Sheets

COLLECTION CONTAINER ASSEMBLY

BACKGROUND OF THE INVENTION

1. Field of the Invention

This invention relates to a specimen collection container assembly and more particularly to a collection container for collecting biological fluid specimens where a small quantity of fluid may be collected and retained in the container while maintaining a container size sufficient to be easily accommodated and/or compatible with standard clinical equipment and instrumentation.

2. Description of Related Art

Blood samples and other biological fluid specimens are routinely taken and analyzed in hospital and clinical situations for various medical purposes. Collection, handling and testing of these samples typically requires the use of various medical testing instruments. As the blood and fluid specimens are usually collected in a standard sized collection tube, the medical instruments used to test the samples are designed to accommodate these standard sized collection tubes.

Conventional blood collection tubes used in most clinical situations are elongated cylindrical containers having one end closed by a semi-spherical or rounded portion and an opposed open end. The open end may be sealed by a resilient cap or stopper. The tube defines a collection interior which collects and holds the blood sample. The most common size of these blood collection tubes are designed to accommodate approximately 10 ml of blood or other biological fluid samples. Illustrative of such blood collection tubes is the VACUTAINER® brand blood collection tube sold by Becton, Dickinson and Company, 1 Becton Drive, Franklin Lakes, N.J. (registered trademark of Becton, Dickinson and Company).

A phlebotomist or other medical technician typically obtains a specimen of the patient's blood in the tube by techniques well known in the art. The tube is then appropriately labeled and transferred from the site of collection to a laboratory or other location where the contents of the tube are analyzed. During collection and analysis the tube may be supported by various medical instruments. The plasma or serum derived therefrom is processed and analyzed either manually, semi-automatically or automatically. In some cases, the specimen must first be dispensed from the collection tube to a sample test tube or cuvette.

In certain situations it is only necessary to obtain a small quantity of blood or other biological fluid specimens. These situations may include pediatric, or geriatric patients and other instances where large blood samples are not required. Small quantities of blood cannot be easily collected in standard collection tubes as described above because the sample level in such containers would not be adequate for retrieval prior to analysis. Such small quantities of fluids also have a tendency to significantly evaporate when stored in larger containers, thus concentrating the chemical and enzymatic constituents therein. This may result in erroneous analytical results and could possibly affect the diagnosis and treatment given to the patient. Therefore, it is desirable to employ small-volume containers which substantially inhibit evaporation for the storage and delivery of minute fluid samples in the laboratory.

Although various fluid containers are available for this purpose, their small overall size and shape make it difficult for the phlebotomist or other medical technicians to handle and manipulate the tubes. Furthermore, such small dimension tubes are generally incompatible with most handling and testing instrumentation. For example, their use in conventional storage racks or those designed for loading into automatic chemical analyzers is substantially precluded because of their small dimensions. Certain automated chemical analyzers are capable of utilizing standardized conventional specimen containers as a means for introducing a patient's specimen into the analyzer. However, they are generally not equipped to handle specimen containers designed to hold small quantities of fluid. In addition, as the labels placed on most blood collection tubes are read by optical instrumentation such as bar code readers, conventional bar code labels may be too large to be supported on the small volume tubes.

Various specimen containers such as those incorporating a "false bottom" have been proposed to achieve decreased volume capacity in conjunction with standard external dimensions. However, these various specimen containers are not compatible with standard clinical equipment and instrumentation due to their design. In particular, these specimen containers have false bottoms with a generally flat, planar bottom end and a circular shaped opening.

Other specimen containers include partial-draw tubes which have standard external dimensions with partial evacuation so that blood fills only a portion of the internal volume. However, partial-draw tubes exhibit a reduction in the draw rate of a sample which reduces the collection efficacy of such tubes. In addition, partial-draw tubes may result in an inconsistent fill volume which may alter test results. Furthermore, it is difficult to determine accurate sample quantities with such partial-draw tubes because the slow rate of sample draw is not consistently measurable.

In clinical use, it is desirable for such specimen collection containers to have rounded bottom configurations that closely simulate a standard-sized blood collection tube configuration instead of planar bottoms. Rounded bottom configurations facilitate compatibility with clinical equipment and instrumentation.

Therefore there is a need to provide a specimen collection container assembly for collecting blood samples and other biological fluid specimens of relatively small volumes where the assembly may be accommodated and/or compatible with standard clinical equipment and/or instrumentation and where the integrity of the sample and specimens are maintained during storage and transport.

SUMMARY OF THE INVENTION

The present invention is a specimen collection container assembly comprising an inner tube within an outer tube. The inner and outer tubes each comprise an open top portion, a closed bottom portion, a sidewall extending from the top portion to the bottom portion and an open end associated with the top portion. Preferably, the dimensions of the inner tube are such that the inner tube fits within the outer tube. The assembly may further comprise a cap or a stopper.

Desirably, the internal volume of the inner tube is less than the internal volume of the outer tube. Preferably, the internal volume of the outer tube is about the same as a standard-sized or full draw blood collection container assembly.

Desirably, the external dimensions of the inner tube are less than the external dimensions of the outer tube. Preferably, the external dimensions of the outer tube are about the same as a standard-sized or full draw blood collection container assembly. Typically, a standard-sized blood collection container assembly has an outer diameter of about 13 millimeters, a length of about 75 millimeters and an internal volume of about 6 mL to about 10 mL.

Most preferably, the assembly of the present invention can be either evacuated or non-evacuated. Desirably, each tube is made from polyethylene terephthalate, polypropylene, polyethylene, polyethylene napthalate or copolymers thereof or glass.

An advantage of the present invention is that it provides a full-draw blood collection container assembly having a reduced internal volume but with external dimensions about the same as a standard-sized blood collection container assembly.

A further advantage of the present invention is that the assembly provides a means for adapting a full-draw blood collection tube to handle a reduced internal volume for handling by equipment configured to handle standard-sized blood collection tubes having standard external dimensions.

Most notably, is that the assembly of the present invention provides a blood collection tube having full draw external dimensions but with a reduced internal volume as compared to standard-sized full draw blood collection tubes.

The assembly of the present invention therefore addresses the need for a full-draw low-volume blood collection container assembly that presents the external dimensions of a standard-sized blood collection tube.

The assembly of the present invention may be used to reliably collect small samples of blood or biological fluids and to maintain the integrity of the samples during storage and transport as compared to using standard-sized blood collection tubes. In addition, the assembly of the present invention can also be accommodated by standard-sized blood collection, transportation, storage, and diagnostic equipment. Furthermore, the assembly of the present invention may be used to reliably collect small samples of blood or biological fluids without being under partial pressure.

The assembly of the present invention is therefore compatible with existing instrumentation, labels, and bar code readers and obviates the need for new instrumentation and handling devices or procedures that would be required for smaller or varying sized tubes.

DETAILED DESCRIPTION

The present invention may be embodied in other specific forms and is not limited to any specific embodiment described in detail which is merely exemplary. Various other modifications will be apparent to and readily made by those skilled in the art without departing from the scope and spirit of the invention. The scope of the invention will be measured by the appended claims and their equivalents.

Figure 1:
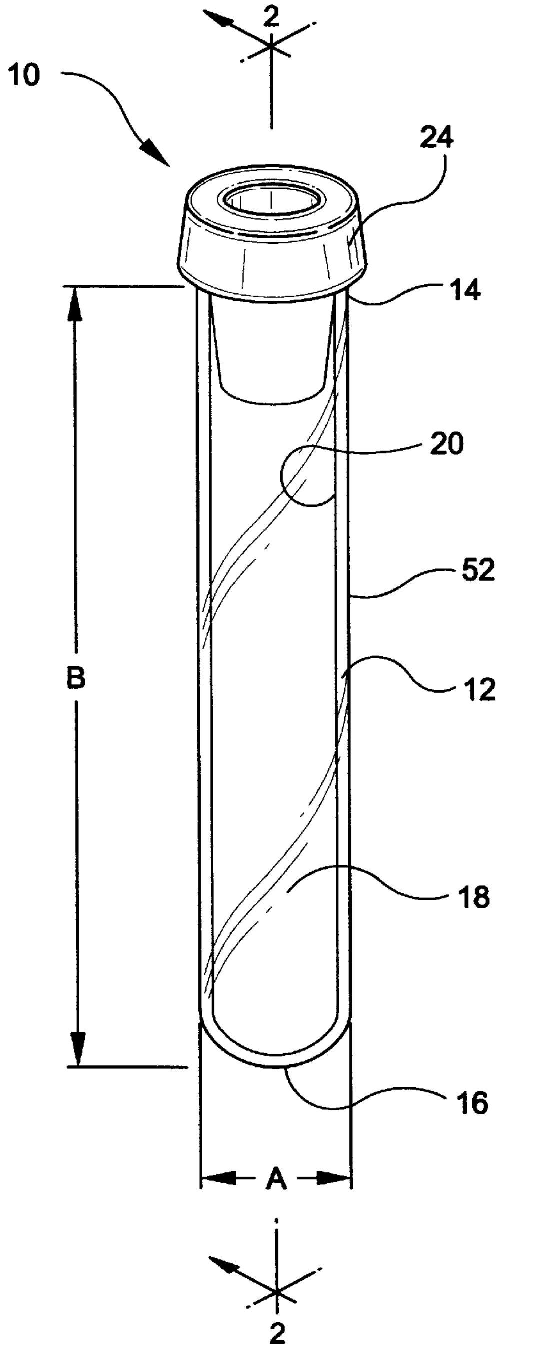
FIG-1 Prior Art
FIG. 1 is a perspective view of a typical blood collection tube.
Figure 2:
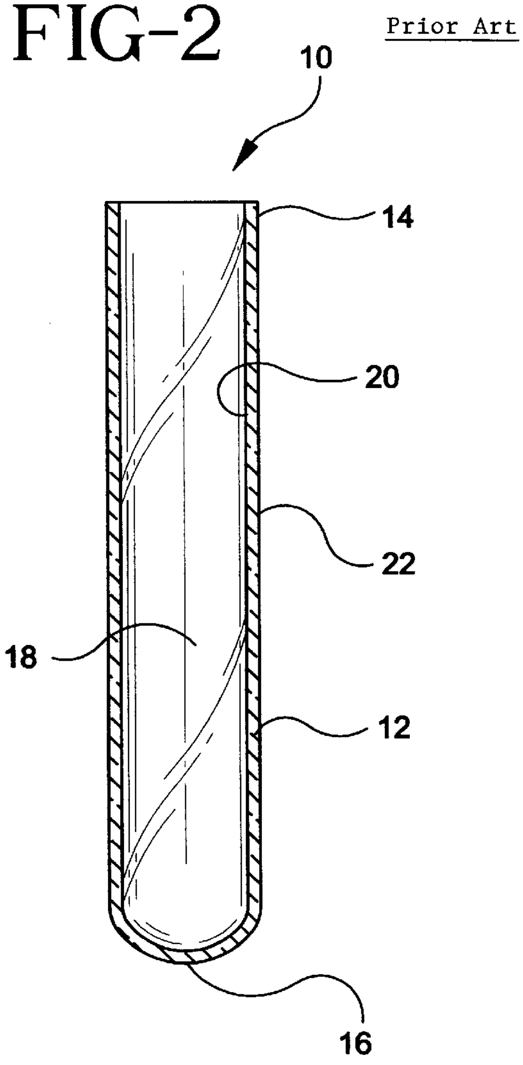
FIG-2 Prior Art
FIG. 2 is a longitudinal sectional view of the tube of FIG. 1 taken along line 2—2 thereof, without a stopper.

Referring to the drawings in which like reference characters refer to like parts throughout the several view thereof, FIGS. 1 and 2 show a typical standard sized blood collection tube 10, having a sidewall 12 extending from an open end rim 14 to a closed end 16 and an interior area 18. Sidewall 12 has an inner wall surface 20 and an outer wall surface 22. Optionally, a cap or stopper 24 may be on the open end rim 14 of tube 10.

Tube 10 is most preferably a standard-sized blood collection tube having an outer diameter A of about 13 millimeters, a length B of about 75 millimeters, and an internal volume of about 10 milliliters.

Interior area 18 is typically maintained at a lower-than-atmospheric internal pressure so that when a blood collection probe penetrates through the cap placing interior area 18 in communication with the circulatory system of a patient, the lower-than-atmospheric pressure of interior area 18 will draw blood from the patient into the tube. Tube 10 may be described as a full-draw blood collection tube because the internal pressure of interior area 18 is low enough to draw a volume of blood substantially equal to the volume of interior area 18.

Figure 3:
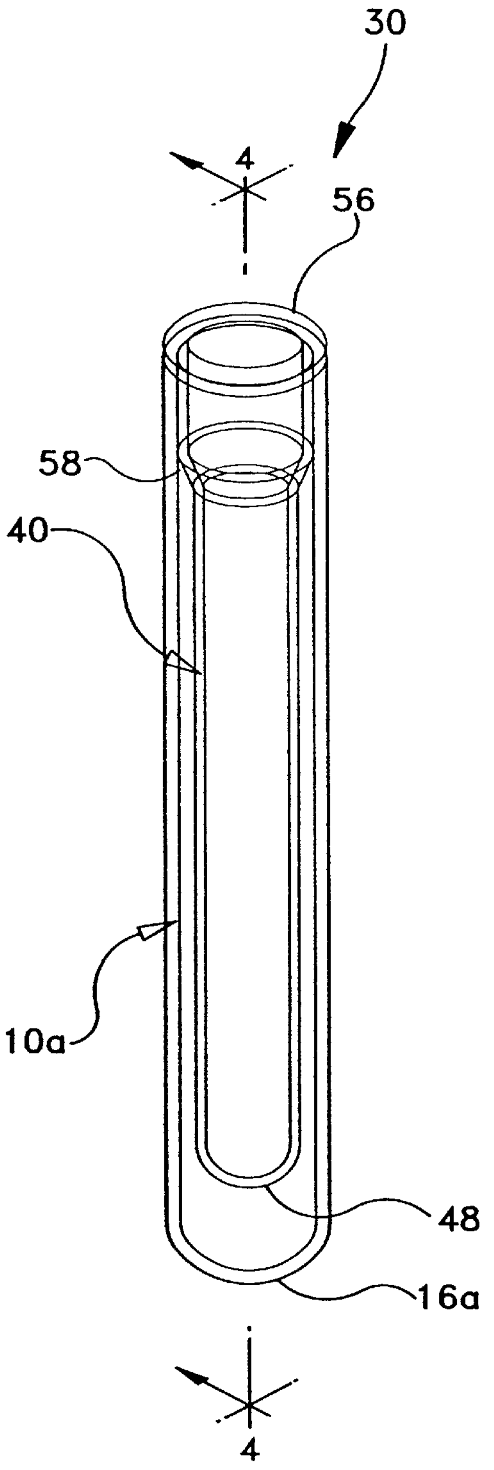
FIG. 3 is a perspective view of the assembly of the present invention.
Figure 4:
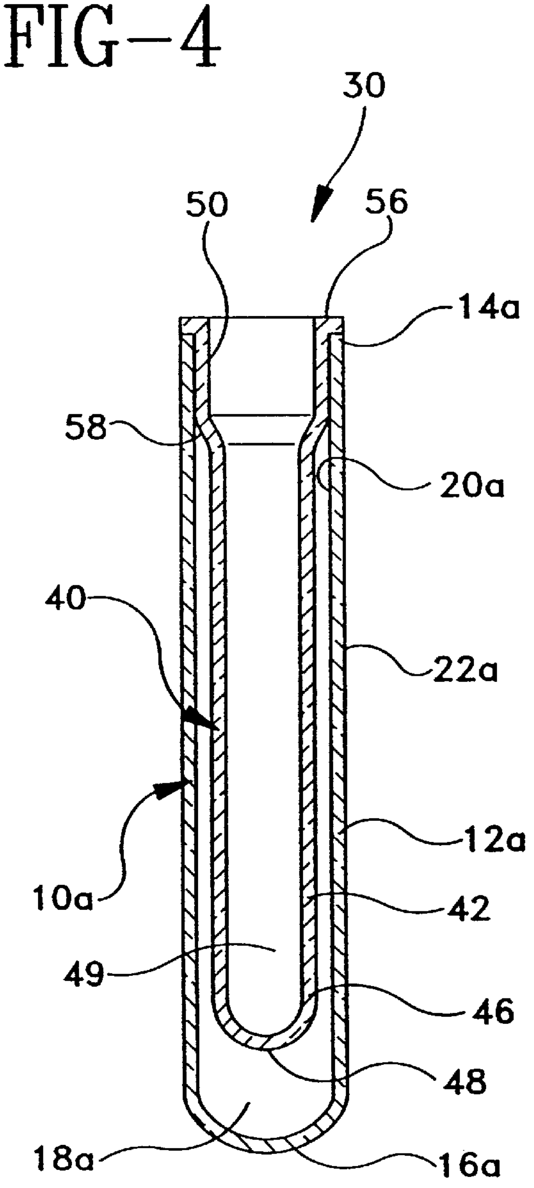
FIG. 4 is a longitudinal sectional view of the assembly of FIG. 3 taken along line 3—3 thereof.

FIGS. 3 and 4 show the preferred embodiment of the present invention, assembly 30. Assembly 30 comprises an inner tube 40 and outer tube 10*a*.

Figure 5:
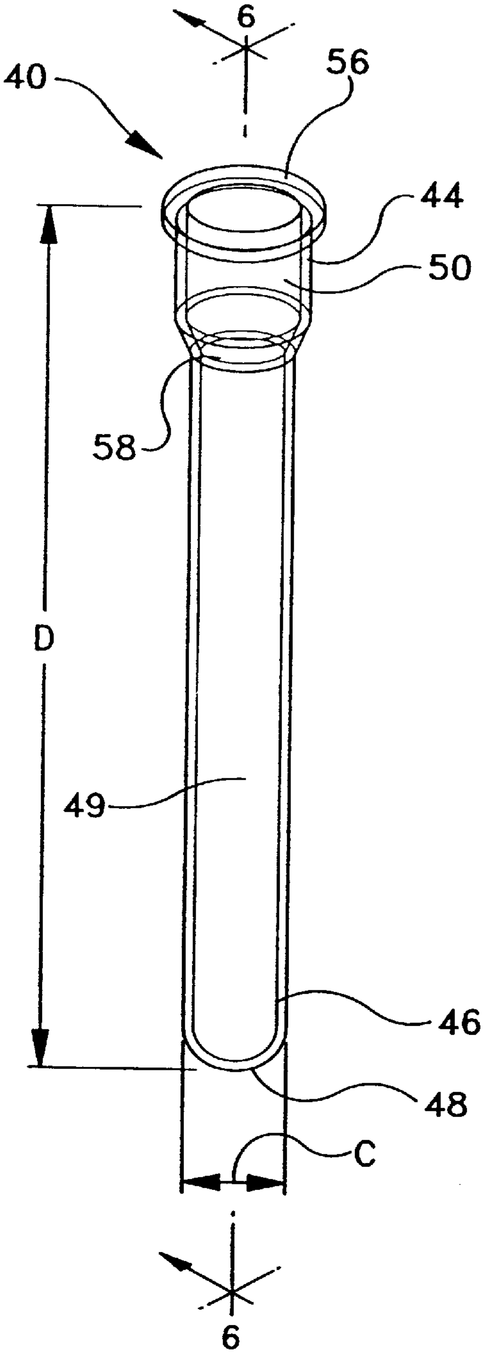
FIG. 5 is a perspective view of the inner tube of the assembly of FIG. 3.
Figure 6:
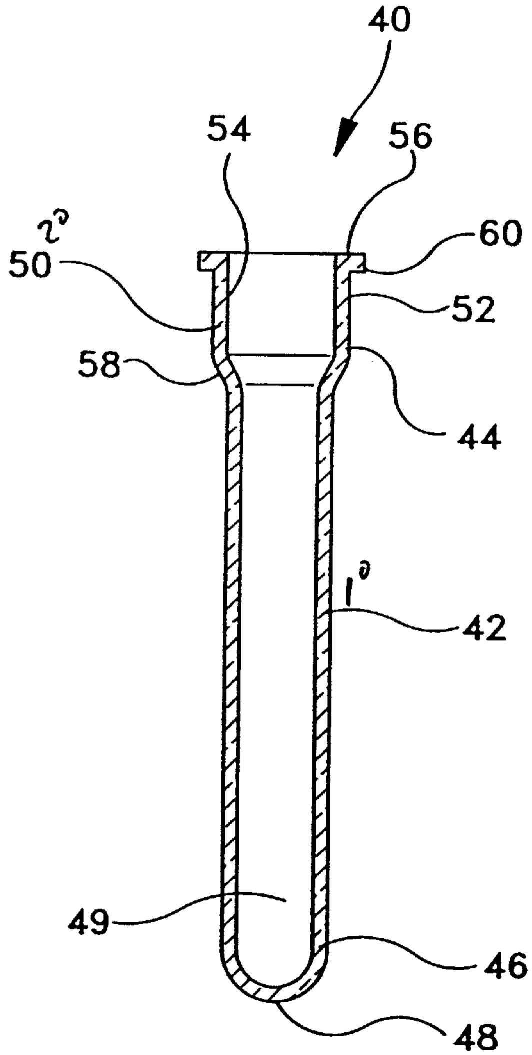
FIG. 6 is a longitudinal sectional view of the inner tube of FIG. 5 taken along line 6—6 thereof.

As shown in FIGS. 5 and 6, inner tube 40 includes a cylindrical sidewall 42 extending from an open end portion 44 to a lower closed end portion 46 having a semi-spherical wall 48 and an interior area 49. Open end portion 44 tapers outwardly to a second cylindrical sidewall 50 whereby cylindrical sidewall 42 has a smaller internal and external diameter than second cylindrical sidewall 50. Second cylindrical sidewall 50 includes an outer surface 52 and inner surface 54. Second cylindrical sidewall 50 extends to an annular rim 56. Annular flange 58 provides the tapering connection between cylindrical sidewall 42 and second cylindrical sidewall 50. Annular shoulder 60 defines the underside of annular rim 56.

Tube 40 has an outer diameter C of about 13 millimeters, a length D of about 75 millimeters, from the rim to the bottom end, and an internal volume of about 1 to 3 milliliters.

The internal volume of inner tube 40 is less than the internal volume of outer tube 10*a* and the external dimensions of inner tube 40 are less than the external dimensions of outer tube 10*a*.

Inner tube 40 is inserted into or mated within the interior area 18*a* of outer tube 10*a* whereby the outer surface 52 of second cylindrical sidewall 50 provides an interference or frictional fit with inner wall surface 20*a* of outer tube 10*a*. While the preferred embodiment of the present invention provides a frictional fit between these two engaging surfaces, it is also contemplated that outer surface 52 could be adhesively bonded to inner wall surface 20*a*. It is further contemplated that inner tube 40 will be inserted into outer tube 10*a* so that annular shoulder 60 of inner tube 40 abuts against open end rim 14*a* of tube 10*a*.

Figure 7:
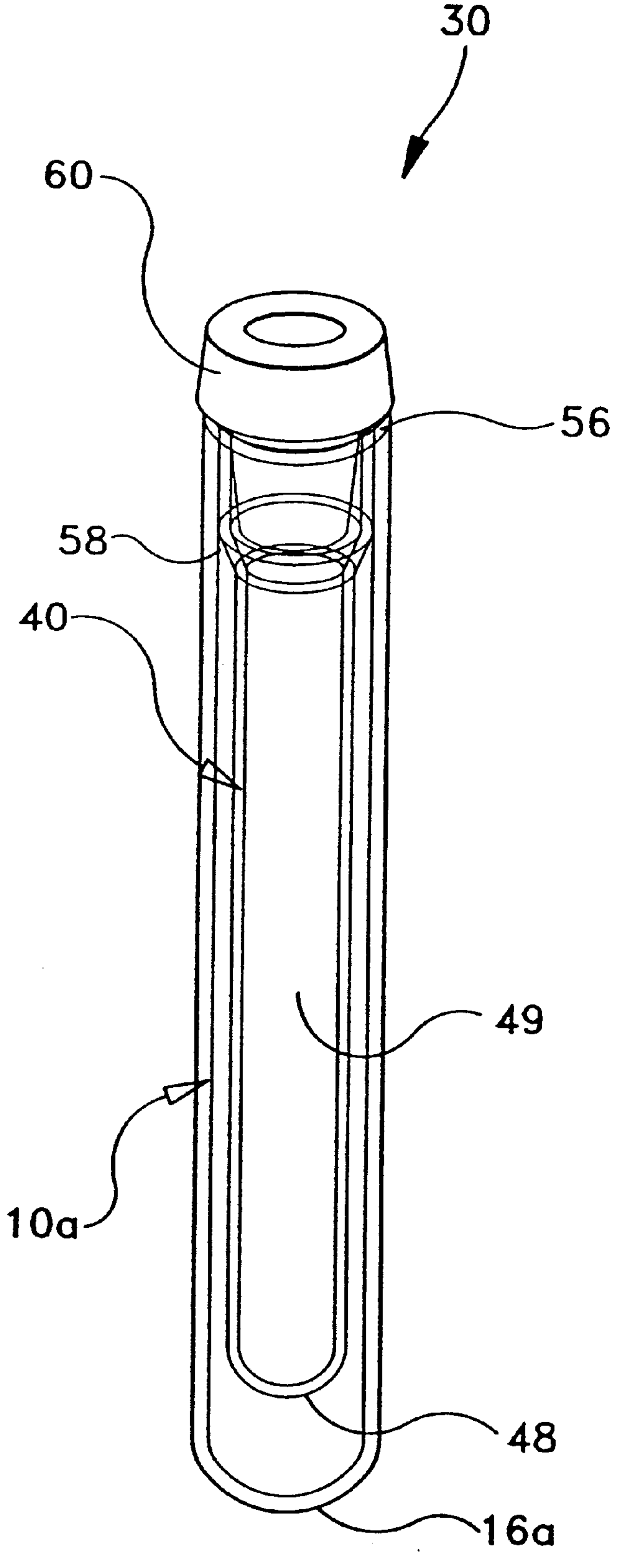
FIG. 7 is a perspective view of the assembly of the present invention, similar to the assembly of FIG. 3, but with a cap.

As is shown in FIG. 7, assembly 30 may be sealed with cap 60. The assembly of FIG. 7 may be evacuated or non-evacuated. When assembly 30 is evacuated, it is provided with a full-draw internal pressure so as to be able to draw a sufficient quantity of blood to substantially fill collection interior area 48.

What is claimed is:

1. A specimen collection container assembly comprising:

an elongate specimen collection tube having an open upper end, a closed lower end, and a first generally cylindrical wall therebetween defining a collection interior, said cylindrical wall having a first diameter, said open upper end having an annular shoulder;

an outer member for accommodating said collection tube in insertable fashion, said outer member having an open end rim and a cylindrical member wall having a second diameter greater than said first diameter, said annular shoulder abutting against said open end rim; and a cap covering said open upper end of said collection tube.

2. The assembly according to claim 1, wherein said collection tube further includes a second generally cylindrical wall defining said open upper end, said second cylindrical wall having a third diameter greater than said first diameter, and having an annular taper transitioning from said first cylindrical wall to said second cylindrical wall.

3. The assembly according to claim 2, wherein said collection tube further includes a third generally cylindrical wall defining said open upper end, said third cylindrical wall having a fourth diameter greater than said third diameter, and having an annular taper transitioning from said second cylindrical wall to said third cylindrical wall.

4. The assembly according to claim 3, wherein said second cylindrical all of said collection tube is dimensioned to engage said outer member by an interference fit.

5. The assembly according to claim 3, wherein said second cylindrical wall of said collection tube is joined to said outer member by an adhesive bond.

6. The assembly according to claim 1, wherein said cylindrical wall of said outer member further comprises an additional specimen collection tube having a closed lower end.

7. The assembly of claim 1 wherein said outer member has a diameter of about 13 millimeters.

8. The assembly of claim 1 wherein said assembly has a length of about 75 millimeters.

9. The assembly of claim 1 wherein said inner member has a volume of about 1 to about 3 millimeters.

10. The assembly of claim 1 wherein said collection tube is made from a material selected from the group consisting of glass and a biocompatible polymer.

11. The assembly of claim 1 wherein said outer member is made from a material selected from the group consisting of glass and a biocompatible polymer.

* * * * *